United States Patent [19]
Medley

[11] 4,040,106
[45] Aug. 2, 1977

[54] FLEXIBLE MAGNETIC DISC DRIVE APPARATUS

[75] Inventor: Harold C. Medley, Los Gatos, Calif.

[73] Assignee: Shugart Associates, Inc., Sunnyvale, Calif.

[21] Appl. No.: 692,886

[22] Filed: June 4, 1976

[51] Int. Cl.² .................... G11B 5/016; G11B 19/04
[52] U.S. Cl. ........................................ 360/99; 360/60
[58] Field of Search ............................ 360/97, 99, 60

[56] References Cited
U.S. PATENT DOCUMENTS

| | | | |
|---|---|---|---|
| 3,678,481 | 7/1972 | Dalziel et al. | 360/99 |
| 3,891,796 | 6/1975 | Takahara | 360/99 |
| 3,947,893 | 3/1976 | Hall | 360/99 |
| 3,975,768 | 8/1976 | Jacques et al. | 360/99 |

Primary Examiner—Robert S. Tupper
Attorney, Agent, or Firm—Boone, Schatzel, Hamrick & Knudsen

[57] ABSTRACT

A flexible magnetic disc drive apparatus comprising a housing including a front plate, a drive spindle rotatably mounted to the housing for rotatably driving a magnetic disc, an elongated frame including opposed rails, opposed first and second ends, and a crossbar extending between the rails and forming a stop, the frame being disposed over the spindle with its second end pivotally mounted to the housing, a latch hingedly mounted to the first end and coupled to the front plate such that the latch is movable between a closed and an open position, a spindle-clamping assembly, an elongated member formed of a resilient material and mounted to the frame proximate the first end such that its distal end is adapted to be engaged by the crossbar when the latch is moved to the open position, the member serving to carry the spindle-clamping assembly and to bias it towards the spindle, whereby when the disc is supported on the spindle and the latch is in the closed position, the member biases the spindle-clamping assembly against the spindle so as to clamp the magnetic disc therebetween, and whereby when the latch is opened and the frame is pivoted away from the spindle, the crossbar engages the member such that continued pivoting of the frame moves the spindle-clamping assembly out of clamping relationship with the spindle so as to allow the magnetic disc to be removed from the spindle.

21 Claims, 3 Drawing Figures

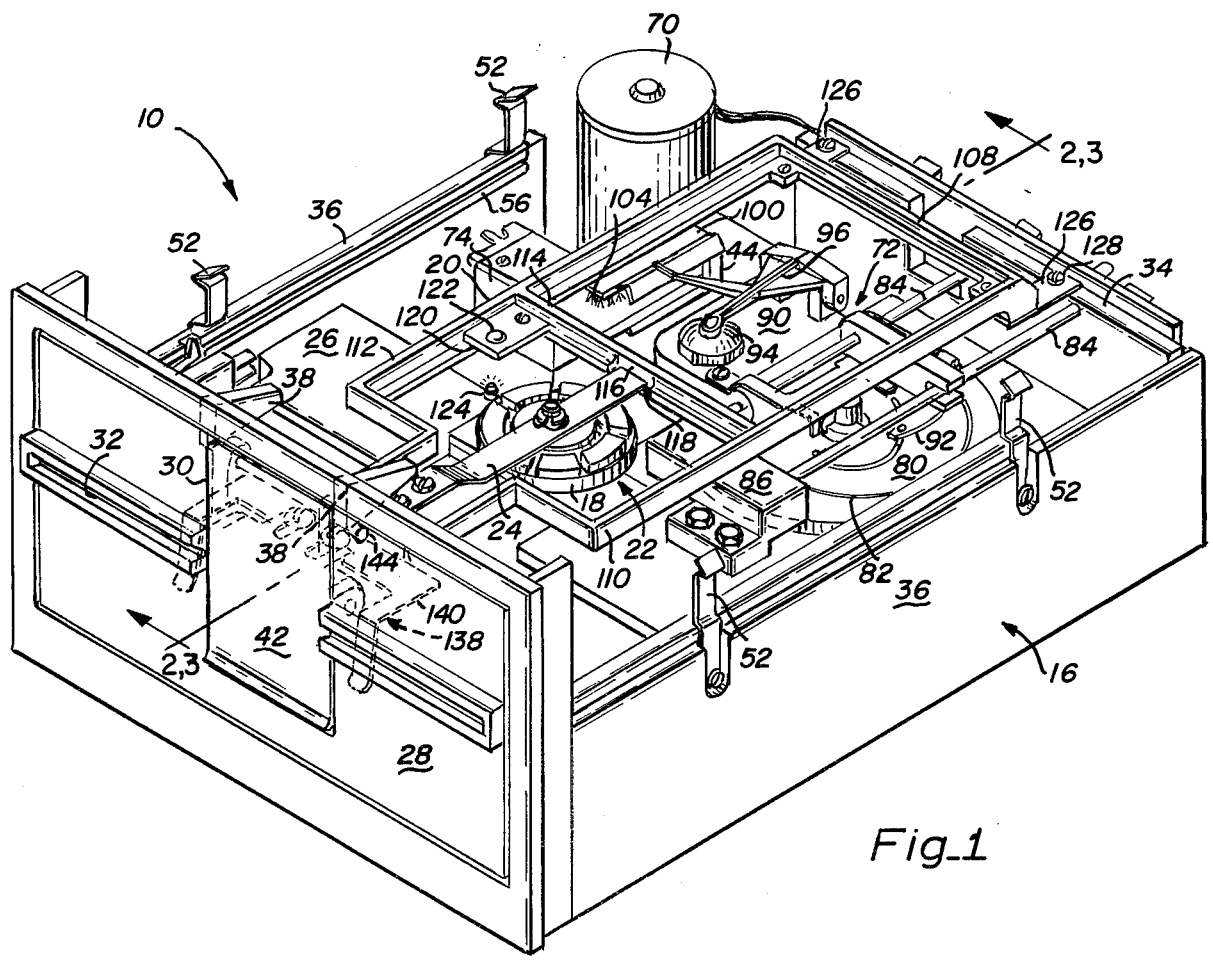
Fig_1
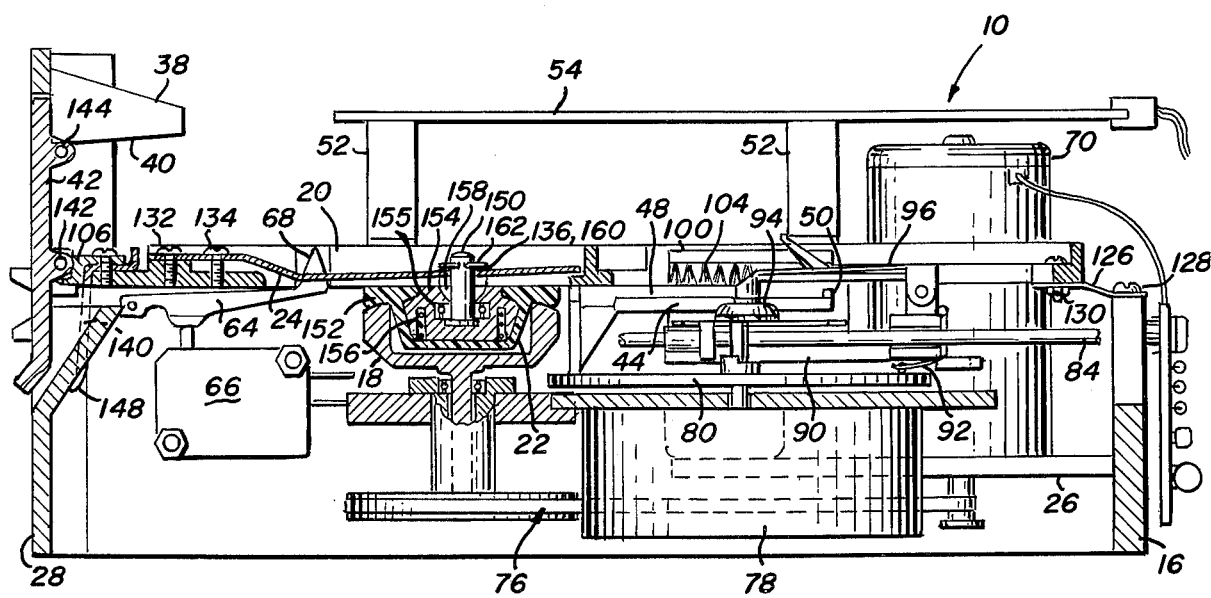
Fig_2

FLEXIBLE MAGNETIC DISC DRIVE APPARATUS

BACKGROUND OF THE INVENTION

1. Field of the Invention

The present invention relates generally to magnetic recording/playback apparatus, and more particularly, to an improved flexible disc drive including an elongated frame pivotally mounted to a housing and disposed over a drive spindle, and an elongated spring member depending from the frame for carrying a spindle-clamping assembly in such a manner as to move it into or out of a clamping relationship with the spindle.

2. Description of the Prior Art

A flexible disc recording medium, sometimes called a floppy-disc or diskette cartridge, is a mylar disc enclosed in a plastic envelope having apertures for enabling the disc to be driven. Magnetic material is secured to the faces of the disc so as to provide the recording surfaces. A flexible disc drive for receiving and making functional use of the cartridge typically consists of a drive mechanism, a read/write head, a track positioning mechanism and means for receiving and loading the cartridge onto the drive mechanism and the read/write head.

In view of the relatively low cost of the diskette cartridges and the capability of the disc drives to randomly access information stored on the disc such devices have been employed in the data processing industry as a micro code back-up, a diagnostic aid, an error logger, and for initially loading a control program for computers and storage control systems. However, flexible disc drives have not been accepted as an information storage device by the word processing industry because of the large size and storage capacities of the flexible discs (i.e. about 500,000 bytes/disc) and the relatively large size and high cost of the disc drive relative to that of magnetic tape cassettes and magnetic card typewriters. For example, magnetic cards generally are capable of storing about 5,000 bytes which corresponds to about one page of typewritten information.

In a prior art flexible magnetic disc drive apparatus of the type used in the data processing industry a rigid disc positioner having a flanged head and a truncated cone-shaped lead surface is mounted to a door of the apparatus. The positioner is capable of being actuated such that the lead surface passes through the central opening of a magnetic disc and into a recess in a drive spindle. Further movement of the positioner stretches the disc opening and slides the disc toward the flanged head of the positioner so as to clamp the disc to the front surface of the spindle. In such a device, a slight annular spacing occurs between the outer surface of the positioner and the wall defining the recess in the spindle which tends to cause a misregistration of the disc upon the spindle and hence, a corresponding eccentricity in scribing the tracks of the disc. In addition, it has been found that when the door is closed with the cartridge slightly misregistered, the disc may be damaged. As previously mentioned such a device is too large and too expensive for use in the word processing industry.

Another prior art device utilizes a cartridge guide to direct the cartridge during its insertion toward the spindle. Such a device typically employs a door fixed to the cartridge guide by means of cams or linkages so that when the door is closed the cartridge is moved into registration with the drive spindle.

In yet another prior art device an apparatus for clamping and centering a flexible magnetic disc is provided which includes a spindle-clamping assembly that is mounted to the door of the device and which utilizes a helical clamp spring to force the clamping assembly into the spindle when the door is closed. However, such clamp springs occupy a relatively large space in the device and consequently cannot be utilized in disc drives having a physically smaller size.

Examples of prior art devices are found in U.S. Pat. No. 3,678,481, entitled "Data Storage Apparatus Employing A Single Magnetic Disk," by Warren L. Dalziel, Jay B. Nilson and Donald L. Wortner; U.S. Pat. No. 3,609,722, entitled "Center Sealing Data Disk Cassette and Processing Machine," to George E. Zenzefilis; and U.S. Pat. No. 3,768,815, entitled "Apparatus For Clamping And Centering A Flexible Magnetic Disk," by Edward L. Mathurin.

SUMMARY OF THE INVENTION

It is therefore an object of the present invention to provide a flexible magnetic disc drive for use in the word processing industry that is capable of randomly and relatively quickly accessing information stored on a flexible magnetic disc, that has a relatively small size and low manufacturing cost, that records at a relatively high bit density and that has a relatively high storage capacity compared to digital cassettes and magnetic card typewriters presently used in the word processing industry.

Briefly, a preferred embodiment of the present invention includes a housing including a front plate having a slot for receiving a magnetic disc cartridge, a drive spindle rotatably mounted to the housing for rotatably driving a magnetic disc within the cartridge, an elongated frame including opposed rails, opposed first and second ends, and a crossbar extending between the rails and forming a stop, the frame being disposed over the spindle with its second end pivotally mounted to the housing, a latch hingedly mounted to the first end and coupled to the front plate such that the latch is movable between a closed and an open position, a spindle-clamping assembly, an elongated member formed of a resilient material and mounted to the frame proximate the first end such that its distal end is adapted to be engaged by the crossbar when the latch is moved to the open position, the member serving to carry the spindle-clamping assembly and to bias it towards the spindle, whereby when the disc is supported on the spindle and the latch is in the closed position, the member biases the spindle-clamping assembly against the spindle so as to clamp the magnetic disc therebetween, and whereby when the latch is opened and the frame is pivoted away from the spindle, the crossbar engages the member so that continued pivoting of the frame moves the spindle-clamping assembly out of clamping relationship with the spindle so as to allow the magnetic disc to be removed from the spindle and from the disc drive apparatus through the slot in the front plate. Leaf springs serve to pivotally mount the second end of the housing and bias the frame away from the housing to facilitate the release of the spindle-clamping assembly from the spindle when the latch is open.

In addition, a camming member is also mounted to the first end. The member serves to cam a cartridge that encloses the disc against a registration surface in such a manner as to prevent the spindle-clamping assembly from wrinkling the disc.

An advantage of the present invention is its relatively small size and low manufacturing cost.

Another advantage of the present invention is its speed in accessing information stored on the flexible magnetic disc and its capability of providing a relatively large storage capacity of about 23 typewritten pages in comparison to digital magnetic tape cassettes and magnetic cards which are able to store information corresponding to about one typewritten page.

Yet another advantage of the present invention is its capability to prevent the latch from closing when the disc is not in registration with the spindle.

Other objects and advantages of the present invention will be apparent to those skilled in the art after having read the following detailed description of the preferred embodiment which is illustrated in the several figures of the drawing.

IN THE DRAWING

FIG. 1 is a perspective view of a flexible magnetic disc drive apparatus in accordance with the present invention;

FIG. 2 is a cross-sectional view taken along the line 2—2 of FIG. 1 schematically illustrating the positioning of the disc clamping components of the present invention in the closed cartridge clamping position; and FIG. 3 is a cross-sectional view taken along lines 3—3 of FIG. 1 schematically illustrating the positioning of the disc clamping components of the present invention in the opend cartridge loading position.

DETAILED DESCRIPTION OF THE PREFERRED EMBODIMENTS

Figure 3:
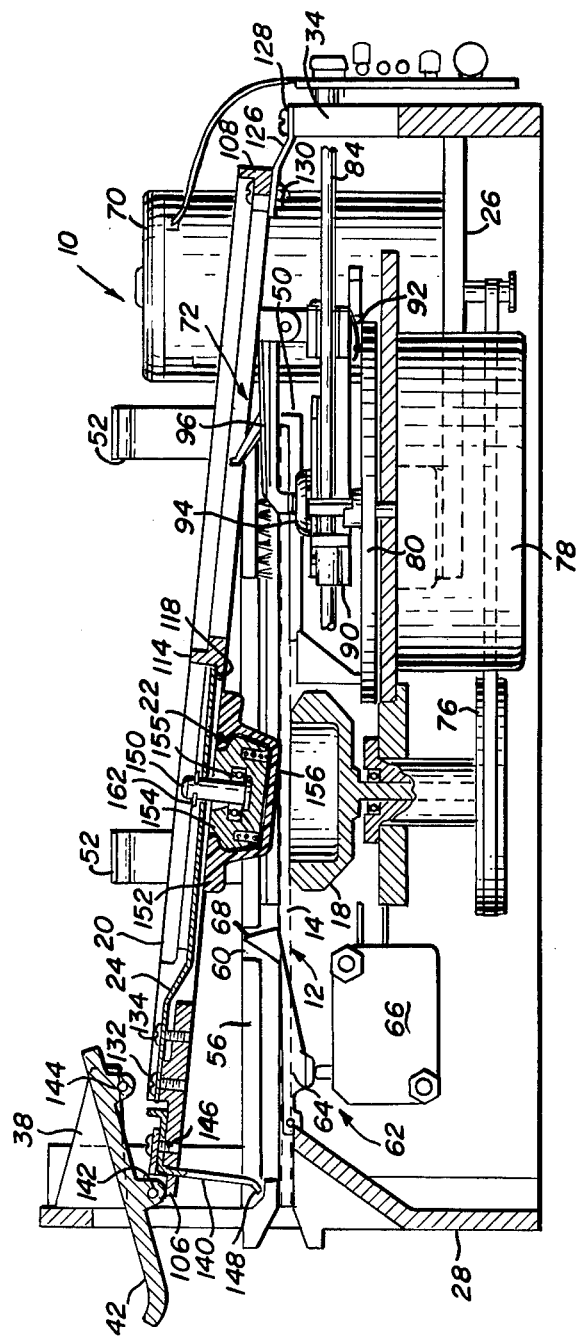

Referring now to FIG. 1 of the drawing, a flexible magnetic disc drive apparatus 10 in accordance with the present invention is illustrated in a perspective view. The apparatus 10 is capable of recording and/or reproducing bits of information in binary form on a flexible magnetic disc 12 which is enclosed in a plastic cartridge or jacket 14 as shown in phantom in FIG. 3. The cartridge is generally of the type shown and described in U.S. Pat. No. 3,668,658 entitled "Magnetic Record Disk Cover," by Ralph Flores and Herbert E. Thompson, although in the preferred embodiment the cartridge for use in the present invention is approximately one-half the size of the cartridge described in the above-identified patent. Accordingly, that patent is incorporated by reference to this specification for details of the flexible magnetic disc.

The apparatus 10 comprises a housing 16, a spindle 18, a frame 20, a spindle-clamping assembly 22, an elongated spring 24 for carrying the spindle-clamping assembly and for biasing the assembly into a clamping relationship with the disc 12 when the disc is disposed on the spindle.

The housing 16 comprises a base plate 26, a front plate or wall 28 having a central opening 30 and a lateral slot 32, a rear wall 34 and side walls 36 and has a generally box-like shape. Protruding inwardly from the top portion of the front plate 28 adjacent the opening 30 are a pair of identical latch guide elements 38. The elements 38 have a shape which is generally trapezoidal in side view and include a bottom surface 40 that is inclined at a slight angle to the horizontal. The surfaces 40 serves to guide a door 42 along a predetermined path as shown in FIG. 3 and as will be subsequently described in detail.

A cartridge support 44 having a generally L-shape protrudes upwardly from the base plate 26 and includes a cartridge support surface 48 and a cartridge registration surface 50 extending substantially normal to the surface 48 for stopping the cartridge 12 in a predetermined position when it is inserted into the apparatus. The central opening 30 and slot 32 are formed to receive the cartridge 12 in a manner which will subsequently be described in more detail. In the preferred embodiment the housing is an integral structure cast from aluminum or the like.

A pair of spaced apart retaining member 52 are affixed to each of the side walls of the housing 16. The members 52 are formed from a resilient material such as spring steel and biased inwardly over the base plate. The members 52 serve to frictionally engage and secure a printed circuit board 54 (see FIG. 2) in a plane that lies substantially parallel to the base plate 26 and perpendicular to the front wall 28 and that is beneath the top surfaces of the walls of the housing. Typically, the printed circuit board 54 includes the electronic components for performing the read/write, logic functions, etc. Alternatively, stand-offs can be employed to mount the printed circuit board to the side walls. A pair of cartridge guides 56 are affixed to the inner surfaces of the side walls and serve to guide the cartridge 12 into position over the spindle 18 when it is inserted into the apparatus. A notch 60 is formed in one of the cartridge guides 56.

A write protect device 62 is mounted to the side wall below the notch 60. The device 62 includes an arm 64 and a microswitch 66. The arm 64 has an end pivotally mounted to the side wall and an opposed end with a finger 68 depending therefrom. The arm 64 is biased such that the finger 68 extends through the notch 60. The microswitch 66 is disposed below a central portion of the arm 64 so as to be actuated when the finger 68 is forced out of the notch 60 and the arm is pivoted downwardly.

Although not shown, it should be recognized that the microswitch 66 is electrically connected in a write enable circuit in the apparatus and the flexible disc cartridge 12 includes a notch (not shown) in its edge that is held by the guide 56 with such notch being aligned with the notch 60 when the disc cartridge is inserted into the apparatus. In use when the disc has information written thereon such that it is not to be erased or re-recorded, an adhesive tape or the like is disposed over the notch in the cartridge. The tape prevents the finger 68 from extending through the cartridge and causes the arm to pivot downwardly and actuate the microswitch 66 which in turn disables the write enable circuit on the printed circuit board 54.

The drive spindle 18 is rotatably mounted to the base plate 26 and serves to driveably enage the magnetic disc 12 in a manner as will be subsequently described.

A drive motor 70, an actuator assembly 72 and a head load solenoid 74 are mounted on the base plate 26 of the housing 16.

The drive motor 70 is of the DC servo motor type and serves to rotate the spindle 18 via a drive belt/pulley coupling 76. In the preferred embodiment, the motor drives the spindle at an angular velocity of about 300 revolutions per minute.

The actuator assembly 72 includes a stepping motor 78, a camming disc 80 having a spiral groove 82 therein mounted on the shaft of the stepping motor, a pair of parallel ways or rods 84 extending longitudinally inwardly between the rear wall of the housing and a mount 86 on the base plate 26, and a carriage 90 movably mounted on the ways 84 so as to have a top surface that lies in a plane generally parallel to the cartridge 12. A spring 92 depends downwardly from the carriage and serves to engage the groove 82 in such a manner as to couple the carriage to the cam disc 80. A magnetic transducer assembly 94 is mounted in the carriage 90 and serves to record and reproduce bits of informatiom on the magnetic record surfaces of the magnetic disc 12. The details of construction and operation of the magnetic transducer assembly are more completely described in co-pending U.S. Pat. application Ser. No. 578,649 entitled "Magnetic Head Assembly and Method of Manufacture Therefor," by Herbert E. Thompson and David A. Brown, filed May 19, 1975, and now U.S. Pat. No. 3,964,103. A load arm 96 is pivotally mounted to the carriage 90 and serves to maintain the disc in compliance with the transducing gap of the magnetic transducer assembly 94.

In operation under control of an appropriate electronic signal, the stepping motor 78 is caused to step in 7.5° increments. Every two steps of the motor cause the cam disc to rotate an angle corresponding to a radial movement of one track. This angular movement is coupled to the carriage 90 through the spring 92 and hence serves to access the magnetic transducer assembly 94 until a preselected track is reached on the disc. The details of the construction and operation of the actuator assembly are more completely described in co-pending U.S. Pat. application Ser. No. 692,643, entitled "Apparatus For Positioning A Magnetic Read/Write Head Employing A Device For Converting Rotary Motion to Linear Motion In A Parallel Plane," by David A. Brown, filed June 4, 1976.

The head load solenoid 74 is mounted by a bracket to the housing 16. A plate 100 formed from a magnetic material is pivotally mounted to the bracket and extends over the coil between the solenoid and the magnetic transducer assembly 94. The plate 100 is movable toward the solenoid 74 when current flows through the solenoid. This in turn causes its distal end to load the disc 14 against the magnetic transducing gap of the magnetic transducer assembly 94 when the solenoid is actuated. A cleaning pad 104 on the plate 100 serves to apply a force to the cartridge to cause the wiping material (not shown) with the cartridge to absorb particles and the like from the surface of the disc as it rotates.

The frame 20 is an elongated rigid structure comprising opposed ends 106 and 108, opposed rails 110 and 112 extending between the ends 106 and 108 and a cross member 114 formed generally parallel to the end 108 for torsionally strengthening the structure. The cross member 114 includes a recessed portion 116 forming a surface 118 which serves to provide a stop for the spring 24 in a manner as will be subsequently described in detail, and a mounting surface having a tapped hole (not shown). A bracket 120 is adjustably mounted to the mounting surface and is generally positioned to correspond to a radius on the disc 14 at which an index hole (not shown) is located. A phototransistor 122 is disposed in a hole in the bracket 120. The bracket is adjusted so that the phototransistor is in proper timing relationship with the index hole. A light emitting diode 124 is disposed in the base plate beneath the phototransistor 122. The light emitting diode 124 emits a beam of light focused toward the phototransistor 122. When the index hole of the rotating disc passes over the beam, the beam is detected by the phototransistor and serves to provide index timing for the apparatus. A pair of leaf springs 126 extending between the rear wall 34 of the housing 16 and opposed portions of the end 108 and secured thereto by screws 128 and 130 are biased to exert a force in the upward direction and serve to pivotally mount the end 108 to the housing 16 in a manner as will be subsequently described. In the preferred embodiment the frame 20 is movable through an angle of about 5° when the door is moved from the closed to the open position.

The spring 24 is elongated member formed from a resilient material such as spring steel and is secured to the end 106 by screws 132 and 134. The spring 24 is prebent and heat treated to a spring temper such that its distal end is biased toward the spindle 18 when the spring is secured to the end 106. This causes the distal end to engage the surface 118 when the frame is in a raised position. Intermediate the ends of the spring is an opening 136.

A latching mechanism 138 comprises the door 42 and a cartridge registration member 140. The door 42 has a generally rectangular shape in front elevation view and is pivotally mounted to the end 106 with a hinge 142 so as to be movable between an open and a closed position. Protruding laterally outwardly from the sides of the latch 42 are a pair of rods 144 which are disposed against the respective surfaces 40 of the latch guide elements 38. The rods 144 serve to engage the surfaces 40 which guide the rods as the latch is moved between the open and closed positions. The cartridge registration member 140 includes a mounting portion that is disposed under the hinge 142 and mounted to the end 106 with a screw or the like 146, an intermediate portion that extends generally perpendicular to the frame 20 and a cartridge engaging portion 148 that is flared outwardly from the intermediate portion and terminates slightly above the slot 32 when the latch is in the open position (see FIG. 3). The cartridge engaging portion 148 serves to cam the cartridge 12 into registration with the registration surface 50 during closure of the latch in situations where the cartridge is not quite fully inserted into the apparatus. This prevents the spindle-clamping assembly 22 from wrinkling the flexible disc and hence destroying the disc during clamping.

The spindle-clamping assembly 22 includes a shaft 150, and a collet 152 and an actuator 154 that are rotatably mounted on the shaft 150. The shaft 150 has a diameter smaller than, and is disposed through, the opening 136. The collet 152 has a generally truncated conical shape in side view and is formed from a flexible material such as delrin. The collet 152 includes a plurality of segments each forming an outwardly protruding lip, which segments are separated by slots. Each lip forms a disc clamping surface and a locating portion for mating with a locating surface of the inner annular wall of the spindle 18. The actuator 154 is an annular body formed from a rigid material such as teflon filled polycarbonate and has a generally truncated conical shape. A bearing assembly 155 is carried by the actuator 154 and serves to rotatably mount it to the shaft 150. The collet 152 is disposed about the actuator and retained in such position by its segments. Accordingly, the collet 152 is rotatable with the actuator about the axis of the shaft. A release spring 156 is provided in an annular recess within the actuator proximate the inner surface of the collet. The release spring 156 serves to bias the actuator 154 and the collet 152 apart. A spacer 158 is mounted to the shaft 150 and serves to retain the ball bearing assembly 156 within the actuator 154. A washer 160 having a generally wave-like shape, and consequently a spring characteristic, is disposed about the shaft 150 in contact with the spring 24 and serves to center the assembly relative to the opening 136 and to restrain lateral movement of the assembly 22 after a retaining member 162 locks the assembly to the shaft 150.

Although not shown, in an alternative embodiment the collet and the actuator can be replaced with an integral structure or the like.

Turning now to FIGS. 2 and 3 the spindle-clamping assembly 22 is illustrated in transverse cross section views which show the assembly in the closed and in the open positions relative to the spindle 18.

With reference to FIG. 2, the apparatus as illustrated in the cartridge loaded, or closed, position. In this loaded position, the disc 14 is centered on the spindle 18 with its faces tightly clamped between the clamping surfaces of the spindle 18 and the collet 152, respectively, and with a portion of its recording surface in contact with the transducing gap of the magnetic transducer assembly 94. In addition, the collet 152 is seated on the spindle due to the spring force of the spring member 24 which remains out of contact with the stop surface 118, so that the release spring 156 is compressed. The disc is maintained in compliance with the transducer assembly by the load arm 96. Accordingly, the disc is rotatably driven on the spindle 18 by the motor 70 and the belt/pulley coupling 76. During disc rotation, the cartridge 14 is restrained from moving by the cartridge guides 56 while the actuator assembly 72 serves to move the transducer assembly 94 to a preselected track on the disc.

When it is desired to remove the cartridge (or likewise, to insert another cartridge) the door 42 is moved from the closed to the open position. As the door handle is pivoted out it rotates about the hinge 142 and allows the bias force associated with the leaf springs 126 to cause the frame 20 to pivot and move upwardly as the rods 144 move along the guide surfaces 40. Simultaneously, the spring member 24 engages the stop surface 118 which enables the release spring 156 to urge the collet 152 and the actuator 154 apart. Continued pivoting of the frame 24 thus moves the collet out of the clamping relationship with the spindle 18. This allows the cartridge 14 to be removed from the spindle through the slot.

With the door 42 in the open position and the opening 30 exposed, cartridge 14 can be inserted through the slot 32 into the cartridge guides 56 until its end reaches the cartridge registration surface 50. When the cartridge 14 is in this position, the hole in the flexible disc is substantially aligned with the central recess of the spindle 18. As the door 42 is pushed downwardly, the frame 24 pivots downwardly about an axis through the ends of the leaf springs 126.

It should be recognized that if the cartridge is not against the registration surface 50, the cartridge engaging portion 148 cams the cartridge into registration as the door is closed. This feature prevents the recording surfaces of the flexible magnetic disc from becoming crumpled or wrinkled by the spindle-clamping assembly.

The movement of the door causes the tapered conical surface of the collet 152 to be urged through the central opening in the disc until the disc is located on the collet. As the collet protrudes further into the recess of the spindle, the release spring 156 is compressed thus assuring that the collet is seated on the spindle. Further rotation of the door and pivoting of the frame 24 enables the elongated spring member 24 to urge the collet into a seated position on the spindle with the surfaces of the disc firmly between the clamping surfaces of the collet and the spindle. As the elongated member urges the actuator 154 against the collet, the collet is radially outwardly expanded until its locating portion firmly mates with the machined locating surface of the spindle in such a manner as to stretch the disc into conformity with the walls of the spindle. Consequently, the disc is concentrically clamped to the spindle.

From the above, it will be seen that there has been provided a flexible disc drive apparatus which fulfills all of the objects and advantages set forth above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A flexible magnetic disc drive apparatus for recording or reproducing data on a flexible magnetic disc comprising:
 a housing including a front plate;
 a drive spindle rotatably mounted to said housing for rotatably driving the disc;
 an elongated frame including opposed first and second ends, and means forming a stop, said frame being disposed over said spindle;
 a latch hingedly mounted to said first end and coupled to said front plate such that said latch is movable between a closed and an open position;
 pivot means for pivotally mounting said second end to said housing;
 a spindle-clamping assembly;
 an elongated member formed of a resilient material and mounted to said frame proximate said first end such that its distal end is adapted to be engaged by said means forming a stop when said latch is moved to said open position, said member serving to carry said spindle-clamping assembly and to bias same towards said spindle, whereby when the disc is supported on said spindle and said latch is in said closed position, said member biases said spindle-clamping assembly against said spindle so as to clamp the disc therebetween, and whereby when said latch is opened and said frame is pivoted away from said spindle, said means forming a stop engages said member such that continued pivoting of said frame moves said spindle-clamping assembly out of clamping relationship with said spindle so as to allow the disc to be removed from said spindle.

2. A flexible magnetic disc drive apparatus as recited in claim 1 wherein said disc is enclosed in a cartridge of the type that may have a notch along a side and said housing further includes side walls having means forming a cartridge guide for receiving said cartridge, said apparatus further comprising means responsive to said notch and operative to selectively preclude the recording of data on said disc when said notch is not present.

3. A flexible magnetic disc drive apparatus as recited in claim 2 wherein said means responsive to said notch includes an arm having an end pivotally mounted to one of said side walls and having an opposed end for engaging said notch, and switch means disposed adjacent said arm and movable between an open and a closed position, whereby when said notch is not present said arm is pivoted against said switch means causing said switch means to move into said closed position.

4. A flexible magnetic disc drive apparatus as recited in claim 1 wherein said front plate has a central opening and a lateral slot for receiving said disc, said latch being configured to cover said central opening, whereby when said latch is in said open position said disc is capable of being inserted through said slot.

5. A flexible magnetic disc drive apparatus as recited in claim 4 wherein said front plate includes means for guiding said latch as said latch moves between said open and closed positions.

6. A flexible magnetic disc drive apparatus as recited in claim 1 wherein said frame is a cantilever structure.

7. A flexible magnetic disc drive apparatus as recited in claim 1 wherein said disc includes an index hole and said housing includes a base plate and further comprising means affixed to said base plate for directing a beam of light upwardly through said apparatus, such that said beam passes through said index hole when said disc is clamped to said spindle, and means disposed on said frame in alignment with said index hole for providing an indication when said index hole is in alignment therewith.

8. A flexible magnetic disc drive apparatus as recited in claim 1 wherein said apparatus further comprising means mounted proximate said first end for camming said disc into registration with said spindle.

9. A flexible magnetic disc drive apparatus as recited in claim 1 wherein said housing includes stand-off means adapted to secure a printed circuit board in a plane generally perpendicular to said front plate.

10. A flexible magnetic disc drive apparatus for recording or reproducing data on a flexible magnetic disc comprising:
   a housing including a front plate;
   a drive spindle rotatably mounted to said housing for rotatably driving the disc;
   an elongated frame including opposed first and second ends, a pair of side rails extending from said first end to said second end, and means forming a stop extending between said side rails, said frame being disposed over said spindle;
   a latch hingedly mounted to said first end and coupled to said front plate such that said latch is movable between a closed and an open position;
   resilient means pivotally mounting said second end to said housing and serving to bias said frame away from said housing;
   a spindle-clamping assembly;
   an elongated member formed of a resilient material and mounted to said frame proximate said first end so as to extend longitudinally between said rails, said member having a distal end adapted to be engaged by said means forming a stop when said latch moved to said open position, said member serving to carry said spindle-clamping assembly and to same towards said spindle, whereby when the disc is supported on said spindle and said latch is in said closed position, said member biases said spindle-clamping assembly against said spindle so as to clamp the disc therebetween, and whereby when said latch is opened, said resilient means pivots and moves said frame away from said spindle causing said means forming a stop to receive said member such that continued movement of said frame moves said spindle-clamping assembly out of clamping relationship with said spindle so as to allow the disc to be removed from said spindle.

11. A flexible magnetic disc drive apparatus as recited in claim 10 wherein said disc is enclosed in a cartridge of the type that may have a notch along a side and said housing further includes side walls having means forming a cartridge guide for receiving said cartridge, said apparatus further comprising means responsive to said notch and operative to selectively preclude the recording of data on said disc when said notch is not present.

12. A flexible magnetic disc drive apparatus as recited in claim 11 wherein said means responsive to said notch includes an arm having an end pivotally mounted to one of said side walls and having an opposed end for engaging said notch, and switch means disposed adjacent said arm and movable between an open and a closed position, whereby when said notch is not present said arm is pivoted against said switch means causing said switch means to move into said closed position.

13. A flexible magnetic disc drive apparatus as recited in claim 10 wherein said front plate has a central opening and a lateral slot for receiving said disc, said latch being configured to cover said central opening, whereby when said latch is in said open position said disc is capable of being inserted through said slot.

14. A flexible magnetic disc drive apparatus as recited in claim 13 wherein said front plate includes means for guiding said latch as said latch moves between said open and said closed positions.

15. A flexible magnetic disc drive apparatus as recited in claim 10 wherein said disc includes an index hole and said housing includes a base plate and further comprising means affixed to said base plate for directing a beam of light upwardly through said apparatus, such that said beam passes through said index hole when said disc is clamped to said spindle, and means disposed on said frame in alignment with said index hole for providing an indication when said index hole is in alignment therewith.

16. A flexible magnetic disc drive apparatus as recited in claim 10 wherein said apparatus further comprising means mounted proximate said first end for camming said disc into registration with said spindle.

17. A flexible magnetic disc drive apparatus as recited in claim 10 wherein said housing includes stand-off means adapted to secure a printed circuit board in a plane generally perpendicular to said front plate.

18. A flexible magnetic disc drive apparatus for recording or reproducing data on a flexible magnetic disc enclosed in a cartridge having a notch along a side, said apparatus comprising:
   a housing having a front plate and side walls, said side walls including means forming a cartridge guide for receiving said cartridge;
   a drive spindle rotatably mounted to said housing for rotatably driving the disc;
   an elongated frame disposed over said spindle and including first and second ends, elongated first and second rails extending from said first end to said second end, and an elongated member intermediate said first and second rails and proximate said first end;
   a latch hingedly mounted to said first end and coupled to said front plate such that said latch is movable between a closed and an open position;
   pivot means for pivotally mounting said second end to said housing;

a spindle-clamping assembly mounted to said member, whereby when the disc is supported on said spindle and said latch is in said closed position, said member urges said spindle-clamping assembly against said spindle so as to clamp the disc therebetween, and whereby when said latch is opened and said frame is pivoted away from said spindle, said spindle-clamping assembly is moved out of clamping relationship with said spindle so as to allow the disc to be removed from said spindle; and means disposed along said cartridge guide for engaging said notch and operative to preclude the recording of data on said disc when said notch is not engaged.

19. A flexible magnetic disc drive apparatus as recited in claim 18 wherein said notch engaging means includes an arm having an end pivotally mounted to one of said side walls and having an opposed end for engaging said notch, and switch means disposed adjacent said arm and movable between an open and a closed position, whereby when said notch is not present said arm is pivoted against said switch means causing said switch means to move into said closed position.

20. A flexible magnetic disc drive apparatus as recited in claim 18 wherein said front plate has a central opening and a lateral slot for receiving said disc, said latch being configured to cover said central opening, whereby when said latch is in said open position said disc may be inserted through said slot.

21. A flexible magnetic disc drive apparatus as recited in claim 18 wherein said front plate includes means for guiding said latch as said latch moved between said open and closed position.

* * * * *